(12) United States Patent
Timm et al.

(10) Patent No.: US 8,836,533 B2
(45) Date of Patent: Sep. 16, 2014

(54) DYNAMIC ELECTRONIC COMMUNICATION DEVICE

(75) Inventors: Matthew P. Timm, Eden Prairie, MN (US); Jeffrey T. Griffin, Liberty Township, OH (US); John M. Heitzinger, St. Louis Park, MN (US); David G. Sime, Minnetonka, MN (US)

(73) Assignee: Soligie, Inc., North Mankato, MN (US)

( * ) Notice: Subject to any disclaimer, the term of this patent is extended or adjusted under 35 U.S.C. 154(b) by 442 days.

(21) Appl. No.: 13/216,814

(22) Filed: Aug. 24, 2011

(65) Prior Publication Data

US 2012/0050061 A1 Mar. 1, 2012

Related U.S. Application Data

(60) Provisional application No. 61/376,597, filed on Aug. 24, 2010.

(51) Int. Cl.
*G08B 5/00* (2006.01)
*G06Q 30/02* (2012.01)
*G04F 1/00* (2006.01)

(52) U.S. Cl.
CPC ............... *G04F 1/005* (2013.01); *G06Q 30/02* (2013.01)
USPC ............... 340/815.4; 340/539.1; 340/539.11; 340/539.13

(58) Field of Classification Search
USPC ............ 340/815.4, 539.1, 539.11, 539.13
See application file for complete search history.

(56) References Cited

U.S. PATENT DOCUMENTS

| | | | |
|---|---|---|---|
| 7,821,794 B2 | 10/2010 | Pennaz et al. | |
| 7,913,382 B2 | 3/2011 | Heitzinger | |
| 7,977,173 B2 | 7/2011 | Heitzinger et al. | |
| 2004/0124988 A1 | 7/2004 | Leonard et al. | |
| 2004/0128246 A1 | 7/2004 | Takayama et al. | |
| 2006/0227523 A1 | 10/2006 | Pennaz et al. | |
| 2009/0164293 A1* | 6/2009 | Coley .............................. | 705/9 |
| 2011/0122120 A1 | 5/2011 | Feuilloley | |

FOREIGN PATENT DOCUMENTS

| | | |
|---|---|---|
| EP | 1437695 A2 | 7/2004 |
| FR | 2930523 A1 | 10/2009 |
| JP | 2004020771 A | 1/2004 |
| WO | WO/0036560 A1 | 6/2000 |
| WO | WO/2005064579 A1 | 7/2005 |
| WO | WO/2008107871 A1 | 9/2008 |

OTHER PUBLICATIONS

PCT Written Opinion of the International Searching Authority, dated Oct. 21, 2011, for PCT/US2011/048955, 6 pages.

(Continued)

*Primary Examiner* — Daryl Pope
(74) *Attorney, Agent, or Firm* — Patterson Thuente Pedersen, P.A.

(57) ABSTRACT

An dynamic electronic communication device. The tag according to embodiments of the invention is designed or set to discount, promote, incentivize, or apply information at certain states or within a certain timeframe at initial deployment, the tags themselves being capable of handling the logic. The tag generally includes a circuit, such as a silicon chip, that controls a flexible printed display, which displays the information when applied. The tag is optionally encapsulated in a plastic or glass case. The tag is made of a suitably small size such that the tag can easily be placed on individual items, and can be secured to other objects via an adhesive backing, sewn in, pinned on, and the like.

21 Claims, 6 Drawing Sheets

(56) References Cited

OTHER PUBLICATIONS

PCT Notification of Transmittal of the International Search Report, dated Oct. 21, 2011, for PCT/US2011/048955, 5 pages.

PCT Notification Concerning Transmittal of International Preliminary Report on Patentability, dated Mar. 7, 2013, for PCT/US2011/048955, 7 pages.

* cited by examiner

DYNAMIC ELECTRONIC COMMUNICATION DEVICE

RELATED APPLICATION

The related application claims the benefit of U.S. Provisional Application No. 61/376,597 entitled "Dynamic Discount Price Label," filed Aug. 24, 2010, incorporated herein by reference in its entirety.

FIELD OF THE INVENTION

The present invention relates generally to labels or tags used in the sale of items in a store. More specifically, the present invention relates to electronic labels or tags for incentivizing merchandise, such as by offering discounts and/or promotions, and indicating time sensitive information.

BACKGROUND OF THE INVENTION

The core goal of most merchants is to maximize profits. This goal can be achieved in a number of ways, but the most basic method is by maximizing sales. Maximizing or increasing sales can itself be achieved in a number of ways. However, one of the most basic ways for a merchant to increase sales is to increase the traffic, or number of potential customers, to his store.

Every day, millions of people visit various retail locations. The overwhelming majority of these "prospective" customers purchase something from the store, thereby converting the prospective customer into an "actual" customer. Thus, simply by increasing the number of prospective customers to a store, a merchant is likely to increase the number of purchases by actual customers and, in turn, realize an increase in profit. Merchants operating in a brick-and-mortar environment long ago realized this as a fundamental principle of business.

Creating an incentive, then, for potential customers to physically visit a store is of the utmost importance for any retailer. Merchants have used various methods to achieve this goal, including through the use of loyalty programs, gift certificates, convenient store location, and the like. However, one of the most tried-and-true methods is to appeal to bargain shoppers. Offering a discount on items or the potential for a discount on items will invariably attract cost-conscious consumers.

Discounting items in a store is generally done via one of two ways. Either individual items are marked down ad-hoc by store employees, or items in bulk are marked down, generally on a scheduled basis, by discounting an entire stock-keeping unit (SKU) of the same product. Both of these implementations have downsides. Discounting items by hand requires store employees to spend time re-labeling each item every time the price is reduced to reflect the particular item's price reduction. It is thus costly to implement more than one price reduction on individual items. Discounting items by entire SKU is less time-intensive than hand-marking, but lacks the ability to mark down individual items. Further, because discounting items by entire SKU is generally done on a scheduled basis (for example, every Sunday in a grocery store when the weekly sales fliers come out), customers can schedule their visits to the store. It would be advantageous to retailers for potential customers to make more trips to their stores.

Another time-tested method that retailers use to create an incentive for potential customers to visit a store is through the creation of contests. The appeal of contests, of course, is largely due to the possibility of winning the contest. Contests can take many forms including sweepstakes, treasure hunts, or drawings. While each contest will invariably be unique, the overreaching idea of all contests is that once potential customers are drawn to the store by the contest, they are more likely to purchase something from the store than had they not been drawn to the store. Holding a contest is not without its costs, however. The cost of overhead in administering the contest as well as the cost of the prizes themselves must be factored in when deciding to hold a contest.

Some retailers have gone one step further and combined aspects of discounted prices with aspects of a treasure hunt-type contest. A merchant will mark down individual items in the store, and advertise to potential customers that it has done so, but not tell the customers which items it has marked down. In this manner, the store creates a "treasure hunt" for those people who are bargain shopping. The combination of the potential to purchase discounted items plus the appeal of a "contest" in the form of a treasure hunt will likely drive customer traffic to retailers. Thus, there is a need for a cost-effective implementation that facilitates such a combination.

Current implementations vary from the rudimentary hand-affixed paper labels to more modern electronic price tags. However, none of these solutions is fully effective in meeting the needs of the industry.

While it may be necessary to hand label a first label of an item, it is not efficient to perform subsequent hand labeling of the same item. Having employees re-label by hand individual items is extremely time intensive. Often, these employees would be better served tending to a value-added activity of the store. And because hand re-labeling is an activity performed by people (rather than a machine) the possibility of errors exists. For example, a store employee may accidentally mark down more or less merchandise than was intended, or mark down altogether incorrect merchandise.

Several advances have been made in the field of electronic price tags. However, on the whole, these tags are bulky and costly. It would be extremely expensive and inefficient to place one of these electronic tags on each individual item in the store. Because these tags are generally placed at the SKU level, they suffer from many of the same problems as traditionally-labeled tags. Individual items cannot be discounted. Further, when discounting is done on a scheduled basis, customers can minimize their trips to a retailer's store (which decreases customer traffic). Thus, there is a need for a streamlined, low cost, efficient method of discounting individual items in a store.

SUMMARY OF THE INVENTION

An electronic dynamic communication device according to embodiments of the invention can generate or receive pricing or other state information, such as discount or promotional information, and display it according to a strategically designed algorithm, such that it substantially meets the aforementioned needs of the industry. The device can be in the form of an electronic tag or sticker, but is not limited to such form. The tag according to embodiments of the invention is designed to generate and display discount, pricing, loyalty, inventory, or other time sensitive information at certain states defined by the retailer. Those states can be defined on the basis of time, time of day, age of merchandise, randomly, or at some time designated and conveyed by the retailer. The tags themselves contain the means to discount or promote the item at the appropriate states. With suitable design, the tags can show uniform pricing for a given SKU, or can be programmed to indicate special pricing or other state information on individual exemplars of a single SKU.

The dynamic electronic communication devices according to embodiments of the invention have the potential of changing the way specialty retailers drive store traffic. Through the use of the device in the form of, for example, a tag or sticker according to embodiments of the invention, individual items can be put on sale or can be associated with promotional offers or incentives at randomized times, creating a type of "treasure hunt" for bargain seekers and compelling them to revisit the stores often in order to find newly discounted or promoted items. Further, rather than simply going to a clearance area such as a clearance rack, shoppers will be compelled to sort through an entire store inventory or significant portion thereof seeking premium or targeted items which are discount priced or promoted, creating opportunities for additional impulse buying by the bargain hunters.

As described below, the tag or label can comprise a thin, flexible sticker similar to a traditional sticker, but with a built-in electronic count-down timer and display. The tags or stickers can be applied at the item-level and can count-down at random rates, with the intent that when the timer reaches "zero" or other defined state, the item will be discounted, promoted, or otherwise incentivized at the register. It is further possible that the tags or stickers generate random discount rates rather than a time-based system.

The tags according to one non-limiting embodiments of the invention allow incentivizing, such as by discounting, items at the item level as opposed to discounting product by SKUs, sizes, or other categories. Shoppers are then compelled to revisit the store often to determine what is on sale, and/or how much an item has been discounted at that particular time or day, creating a "treasure-hunt" experience for the buyer as explained above. This new paradigm in sales pricing can create an opportunity to drive significant store traffic, and to compel shoppers to look through non-discounted items.

In an alternative embodiment of the invention, the tags are used to indicate or display promotional features other than or in combination with discounts, thereby identifying a promoted or premium item. Such promotional features can include, for example, an earned reward such as customer loyalty points or credits, a coupon to purchase additional same or different items from the store, and the like and combinations thereof. For example, if a customer purchases an item with the dynamic label or tag on it, rather than or in combination with receiving a discount for the particular item, the customer can earn reward or loyalty points that are then loaded onto a loyalty card or other account for further shopping or redemption purposes.

The thin size and flexibility of the electronic tag or labels according to embodiments of the present invention make it suitable for use in any circumstance in which a conventional price tag may have been used, including but not limited to, clothing, shoes, toys, groceries including meats, baked goods, or produce, books, CDs, and certain items available at big box retailers, grocery stores, retail stores, malls, warehouses, pharmacies, boutiques, greenhouses, flower shops, produce stores, pet shops, salons, bakeries, art stores, music stores, bookstores, and any of a variety of stores or items.

Further, the electronic tag of the present application can be manufactured at a low cost and be provided to retailers at a low cost. This benefits retailers in a number of ways. Most importantly, a low-cost tag makes it cost-effective to place a tag on individual items rather than only on an entire stock of items at the SKU level. After placing a tag on individual items, a per-item discounting or promoting is then possible, and the problem of SKU-level labeling is avoided.

Additionally, providing an inexpensive electronic tag of the present application helps retailers cut down on the overhead costs of administering their marketing and sales strategies, such as, but not limited to contests. The tag is fully operational and can be self-contained after it is deployed on any individual item or it can be part of a system with a central control and communications to the tag. Therefore, there is no need for employee maintenance or the need for relabeling of the tags. Once they have been set to discount, promote, or otherwise inform, at certain states or within a certain time-frame at initial deployment, the tags themselves are capable of handling the logic to discount, promote, or otherwise inform the potential buyer of its status. Employees no longer need to re-label further price reductions, promotions, etc., like in the problem with hand-labeled paper tags.

The tag generally comprises a thin, flexible sticker or label with a built-in electronics capability sufficient to derive, display and respond to the states internally, or to receive an external signal sufficient to cause these to be generated. The tag can be made in any number of styles for any number of applications. For example, in one embodiment, the tag contains an integrated circuit (IC), such as a silicon chip, that controls a flexible printed display which displays the discount when the desired state is achieved, and/or the status of the item, for example, but not limited to, what discount is currently being offered in a stage discounting environment, or the progress of when the discount will be offered.

The entire device can be secured to other objects via an adhesive backing. Such an embodiment can attach to almost any packaged item, such as, for example, a grocery item, or an unpackaged item such as clothing. The tagging or labeling can be done in a retail location, such as a store, during the manufacturing or packaging of the item, or during the distribution of the item, such as at a warehouse.

In one embodiment, the tag incorporates an integrated circuit with LCD display with a glass case. Such an embodiment can find application for higher-end merchandise like clothing or department store goods. Additionally, all of the aforementioned embodiments can be made of a suitably small size such that the tag can easily be placed on individual items.

In another embodiment, the tag incorporates an antenna and communication system for communication with a central hub that makes the discounting, promoting, pricing, or other item decisions. In this embodiment, the system is no longer entirely contained within the tag while retaining a key feature of not requiring maintenance by employees.

In the case of an electronic tag with a communication system and antenna, rather than relying on the logic within the tags when deployed, the retailer can utilize the central hub to "push" state information, such as, but not limited to, discount or promotion information, to the individual tags. The hub has the capability of selecting any combination of active tags on items in the store. The retailer could have it push state information to all tags, to some tags, no tags, or differing pieces of state information amongst a set of tags. In another embodiment, the tag's antenna or communication system interacts with a handheld communication device rather than a central hub.

The above summary of the invention is not intended to describe each illustrated embodiment or every implementation of the present invention. The figures and the detailed description that follow more particularly exemplify these embodiments.

Figure 1:
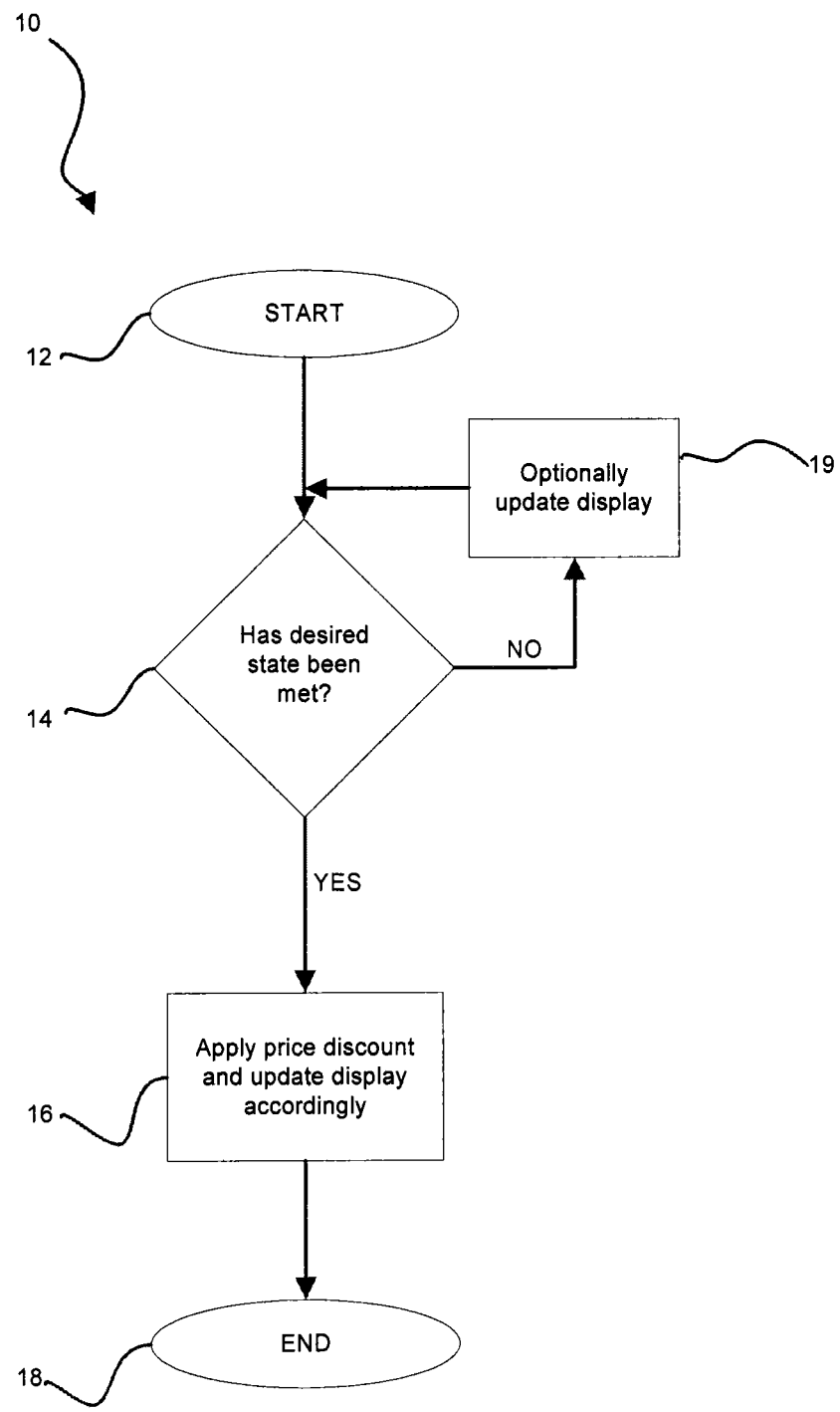
FIG. 1 is a flowchart of the general operation of a self-contained tag, according to one embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE DRAWINGS

The dynamic electronic communication device of the present invention provides a means for tagging and subsequently target or feature, such as by discounting or promoting, individual items in a retail setting. The invention can be more readily understood by reference to its application in FIGS. 1-6 and the following description. While the invention is not necessarily limited to such an application, the invention will be better appreciated using a discussion of exemplary embodiments in specific contexts.

As described above, the dynamic electronic communication device, hereinafter referred to as "the device", can generally comprise a circuit (IC) that can be printed or otherwise integrated or assembled onto a substrate, and a display device operated by the integrated circuit, thereby forming a tag, label, or sticker-type format. The substrate can comprise a flexible substrate such as plastic film or paper, or a rigid substrate such as glass or firm plastics.

The device is flexible and thin with a thickness of between 20 microns and 3000 microns; more particularly with a thickness of between 20 microns and 500 microns, and alternatively with a thickness of between 50 microns and 150 microns. In one embodiment the device can have an appearance and/or feel similar to a conventional paper tag.

Figure 6:
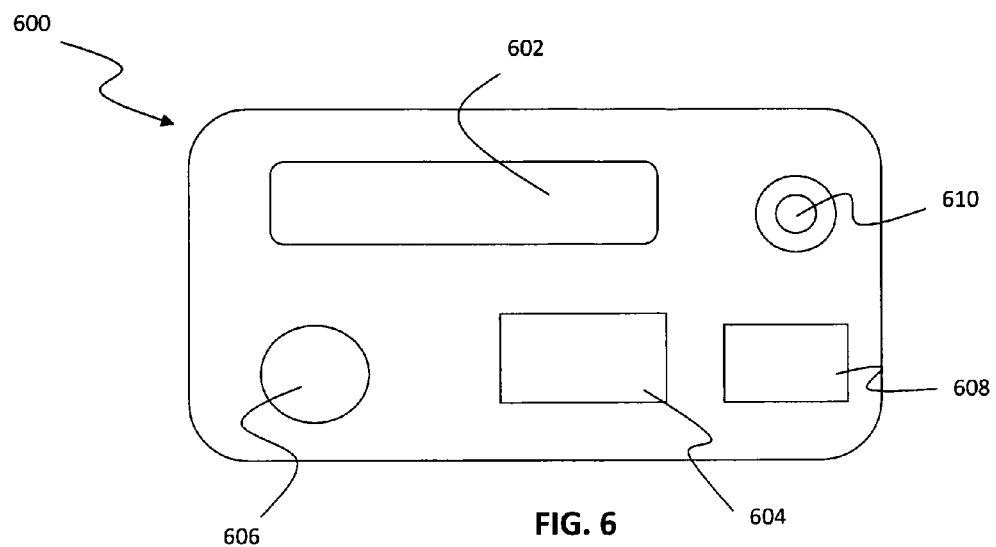
FIG. 6 depicts a dynamic electronic communication device according to an embodiment of the present invention.

FIG. 6 depicts a dynamic communication and indicating device 600 according to an embodiment of the invention. Some of the disclosed components represent options or alternate system choices to achieve a substantially similar effect. Within the overall envelope of device 600, there is a display 602, a control system 604, such as an integrated circuit or processor (CPU) for executing algorithms, and optionally for controlling display 602, a power source 606, a communication system or module 608 (optional), and a means 610 to initialize, reset, power up, and/or lock device 600 in its current state, display 602, or the processor 604, such as buttons, tabs, switches, or other actuators, assembled on one or both sides of a substrate 601.

Display 602 can comprise a printed display, liquid crystal display (LCD), flexible LCD, light emitting diode (LED), organic light emitting diode (OLED), electronic paper display, or any of a variety of suitable display or otherwise indicating devices.

Control system 604, such as an integrated circuit or discrete circuits, provides the logic to target or feature the item at certain states, within a certain timeframe, or randomly, and/or controls a flexible printed display which displays the time sensitive information, such as, but not limited to, the discount when the discounted state is achieved, and/or the status of the discount, i.e. what discount is currently being offered in a stage discounting environment, or the progress of when the discount will be offered. As discussed above, the device and logic is not limited to the discounting of items, but can also be used for promoting, and/or identifying any of a number of incentives or other information for the labeled item. Such information can include, for example, displaying price, bonus or loyalty points, time remaining for the incentive, stock level, and the like, or combinations thereof. Any reference to discounting throughout is for exemplary purposes only and one of ordinary skill in the art would recognize that other incentives or state or item-level information can be contemplated.

Power source 606 powers the circuit or control system 604, and can comprise a battery, a photovoltaic cell, a capacitor, a fuel cell, or other suitable power source and combinations of these power sources. The battery can comprise a coin cell battery, printed battery, or any of a variety of batteries known to one skilled in the art.

Communication system 608 can comprise a wireless communication system or protocol such as, for example, local area networks (LANs) and connecting devices including WiFi (per IEEE 802.11 standard), ultra-wideband (UWB) and the like, wireless personal area networks (WPANs) technology and connecting devices including Bluetooth® transceivers (per IEEE 802.15), any other radio frequency devices such as systems associated with radio frequency identification (RFID), low-power digital radios based on an IEEE 802 standard for wireless (WiFi) networks such as a ZigBee-based device, an infra-red communication system, or any combination thereof.

The tag or label can optionally be encapsulated by any of a variety of material including a plastic wrapping, a plastic or glass casing, or any of a variety of encapsulation materials and combinations thereof.

The devices or tags according to embodiments of the invention can be made by a variety of techniques. This general schematic representation depicted in FIG. 6 compliments the device embodiment description above and is included to allow the following discussion of possible approaches to manufacturing.

There are at least two distinct approaches that can be employed with respect to the functional capabilities of the device. In one embodiment, the data processing and control of the tag, along with the communications function can be carried out by means of digital electronic circuits designed to utilize discrete components or integrated circuits to provide these functions along with the time base against which they have to work. For example, control system 606 can be an integrated digital circuit containing also the means to track the passage of time.

In another embodiment, certain functionalities can be achieved through the use of analog electronics. For example, the timing functions for the device can be achieved through an analog mechanism such as a slow electrochemical switch, a chemical switch, or some other device which shows variable electrical response with time. Likewise, the timer and indicator function can also be designed to arise from the function of a single device such as described in U.S. Pat. No. 7,821,794 to Pennaz et al., incorporated herein by reference in its entirety.

In yet another case, the functions required can be achieved by an approach which uses a combination of analog and digital elements. Digital elements can be used for certain circuit functions to meet performance requirements, such as in rapid data processing, or precise timing, which are not yet available with analog circuits, while analog circuitry can be used for those functions which can be achieved with simplicity using such an approach.

In each of the embodiments, a source of electrical power 606 is required to drive the electronic systems. A simple power source can be in the form of a battery providing a DC power level of the appropriate voltage and capacity. Such a cell can be primary or secondary, the latter being able to be charge repeatedly to extend its useful life in the device. Alternate power sources can also be constructed from antenna systems and supporting circuitry to scavenge or harvest power from a radiation field. This can either be arranged to work on ambient radiation, or can be tuned to cause efficient power gathering from a directed beam such as that from an RFID reader. Even thermal scavenging can be used by way of a thermopile circuit.

In an alternative embodiment of the invention, an exception to an electrical power source is a tag operated purely on a chemically, or mechanically motivated timer system such as can be found in the form of time and temperature indicators as sold by, for example, TimeStrips, LLC.

To meet the attributes of being thin and flexible, and to conform to the commonly held notion of a label or sticker, the components of the device described in the embodiments can be assembled on thin, flexible substrate including plastics, such as polyesters, polyimides, phenolics, or other suitable plastics, thin fiberglass, metal foils such as stainless steel or aluminum, paper, woven and non-woven webs, and other foils may also be used a substrates for the tag or subsystems thereon. The substrate can have circuitry on one or both sides or may be made with multiple conductive layers as is common now in the electronics industry. The assembly of the components can be achieved by assembly techniques commonly in use in the electronics industry to attach individual elements to a common substrate upon which conductive traces have been constructed to provide means of electrical connection between and among the individual circuit components. The electrical attachment of the components and other circuit elements to the conductive traces is conventionally achieved by use of solder. This means of construction can also be applied to a circuit for the device based on a rigid substrate. The components to be thus attached can range from a single passive circuit element, such as a resistor, to a subsystem of some complexity, such as a display 602 or communications module 608. Batteries or other power sources can also be attached in similar or related ways.

An alternate construction comprises a thin substrate on which the circuit traces have been formed by additive techniques such as printing, coating, spraying, vapor deposition, or combinations thereof which again can be on either a thin rigid or flexible substrate. These circuits also can be single- or double-sided or can be constructed as multilayer circuits by repeated steps of additive processes, such as printing, in a manner similar to that of a conventionally made multilayer PC board. In the case of many printed conductive traces, materials other than solder (or other eutectic systems) must generally be used to make the electrical connections between the components and the circuitry. Alternate forms include one- or two-part epoxies, filled with conductive material, such as, for example, electrically conductive adhesive XCE3104XL available from Emerson & Cuming of Billerica, Mass.

To form the traces by additive processes, printing can be carried out in a number of forms including screen-printing, flexo-printing, gravure, ink-jet, or aerosol printing using inks formulated to provide an electrically conductive path when printed and dried or cured. Examples can be found in the catalog "Polymer Thick Film Selector Guide" by DuPont Microcircuit Materials.

Subsystems themselves can be formed either from the assembly of discrete components or ICs, or they too can be formed by an additive, or largely additive process such as printing. In either case these can be formed either as individual elements in a standalone format ready to be attached to the tag assembly, or they too can be integrated, either partly or entirely onto the tag assembly.

Printing methodologies or techniques utilized for additive printing of circuits or circuit components in such embodiments can include, for example, any form of gravure, waterless offset, direct image waterless offset, dry offset, lithographic, intaglio, embossing, engraving, screen, rotary screen, silkscreen, letterpress, flexography, and other related printing techniques or combinations thereof. Digital printing such as ink jetting techniques can also be used. In each case, the several layers of the device may be deposited either by multiple applications of the printing technique at a single station, or by multiple application a series of stations in a multi-station system. Likewise, the use of different techniques, for example, screen printing and ink jet printing, can be achieved with multiple different stations arranged in line. As with printed product, the requirements for registration, ink weight deposition, precision of geometry (dimension and tolerance), speed, and drying/curing requirements will drive the choice of equipment or printing technique, or the combination thereof.

In embodiments in which the use of Silicon (Si) electronics can be avoided, fully printed devices can be constructed and integrated onto a single substrate using the printing techniques identified above.

Other examples of circuit or circuit component fabrication utilizing deposition, patterning, and/or printing techniques can be found in U.S. Pat. No. 7,977,173 entitled "Silicon Thin Film Transistors, Systems, and Methods of Making Same," and U.S. Pat. No. 7,913,382 entitled "Patterned Printing Plates and Processes for Printing Electrical Elements," both of which are incorporated herein by reference in their entireties.

In each of the embodiments described, any combination of these manufacturing approaches can be used and combined and this discussion is not intended to limit or restrict the methods or combinations of methods used.

A dynamic electronic communication device according to embodiments of the invention can be utilized to display or otherwise indicate dynamic time sensitive information, such as, but not limited to, the discounting, promoting, identifying, or incentivizing of individual items in a retail setting, in a wide variety of ways. The flexibility of a programmable algorithm either contained on the tag, or centrally in a retail location, offers an almost infinite variety of use models, some non-limiting examples of which are described below and which are left to the user's discretion. The examples are referring to discounting of items; however, as discussed above, not only does the logic allow for discounting of items, but also refers to promoting, and/or identifying any of a number of incentives for the labeled item, such as, for example, displaying price, bonus or loyalty points, time remaining for the incentive, stock level, and the like, or combinations thereof.

Referring to FIG. 1, and according to one example of use of the device of the invention, operation of a dynamic electronic communication device 10, such as a discount price tag, is depicted. For exemplary purposes only, tag 10 comprises a discount price tag; however other information such as customer rewards, as described above, can be displayed using similar logic. Starting point 12 illustrates the instant in time when the tag is deployed on a particular retail item. The tag may be affixed, attached, or secured in any number of ways including by adhesive backing, mechanical attachment such as screws, clips, pins, magnets, or any other means. Next, the tag's circuit performs the required logic to determine when the price should be discounted. The basic decision point 14 asks whether a predetermined desired state has been met.

Defining the decision point 14 generally illustrates the infinite flexibility of the tag's operation. The decision point 14 could utilize the time, day, week, month, an independent counter, random number generation, or any of myriad other possibilities. Should the logic determining whether the desired state has been met answer in the affirmative, the tag then displays the desired price discount and/or that the desired discount is to be applied 16. Subsequently, the operation of embodiment 10 ends 18. However, should the logic determining whether the desired state has been met answer in the negative, the dynamic tag recursively returns to decision point 14. Optionally, as the dynamic tag recursively returns to decision point 14, the display can be updated at 19 to reflect the status or timing of when the discount is to be applied, thereby creating a sense of urgency in the customer.

By operating in this manner, the tag can patiently wait for the retailer's desired state to arise before discounting the item. When the operation ends and/or the display is incrementally updated, the desired price discount or discount status can be either displayed on the tag itself, and can be in the form of a message or code, such as an alphanumeric code, bar code, color code, sound indicator, or any other form of message or code as desired that can be interpreted or applied by the store customer at the time of customer checkout.

Figure 5A:
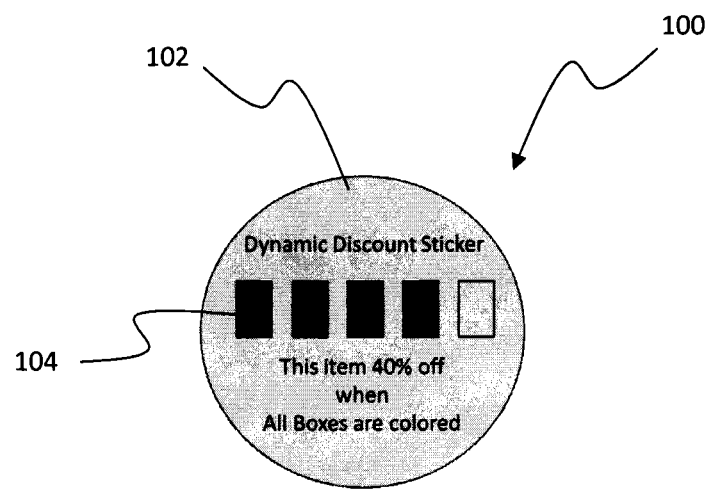
FIGS. 5A and 5B are self-contained tags according to embodiments of the present invention.

In one particular embodiment of the invention, as shown in FIG. 5A, dynamic tag 100 generally comprises a display 102 having one or more incremental indicators 104, and an IC operating a count-down timer (not shown). In the illustrated embodiment, incremental indicators 104 are visual indicators in the form of a series of bars that each turn color upon activation. Each time the dynamic tag recursively returns to a decision point because a predetermined desired state has not been met, the next inactivated incremental indicator 104 in series is activated until all but one incremental indicator 104 has been activated. Once the desired state has been met, the final incremental indicator 104 is activated, indicating to the customer that the discount as indicated on the tag will be applied at the register.

While example 10 illustrates a simple case of determining one desired state 14 and subsequently displaying one price discount 16, the operation of example 10 can be scaled such that the number of different states and different price discounts is only limited by the retailer's imagination. That is, multiple implementations of example 10 may be performed inside each tag.

Figure 2:
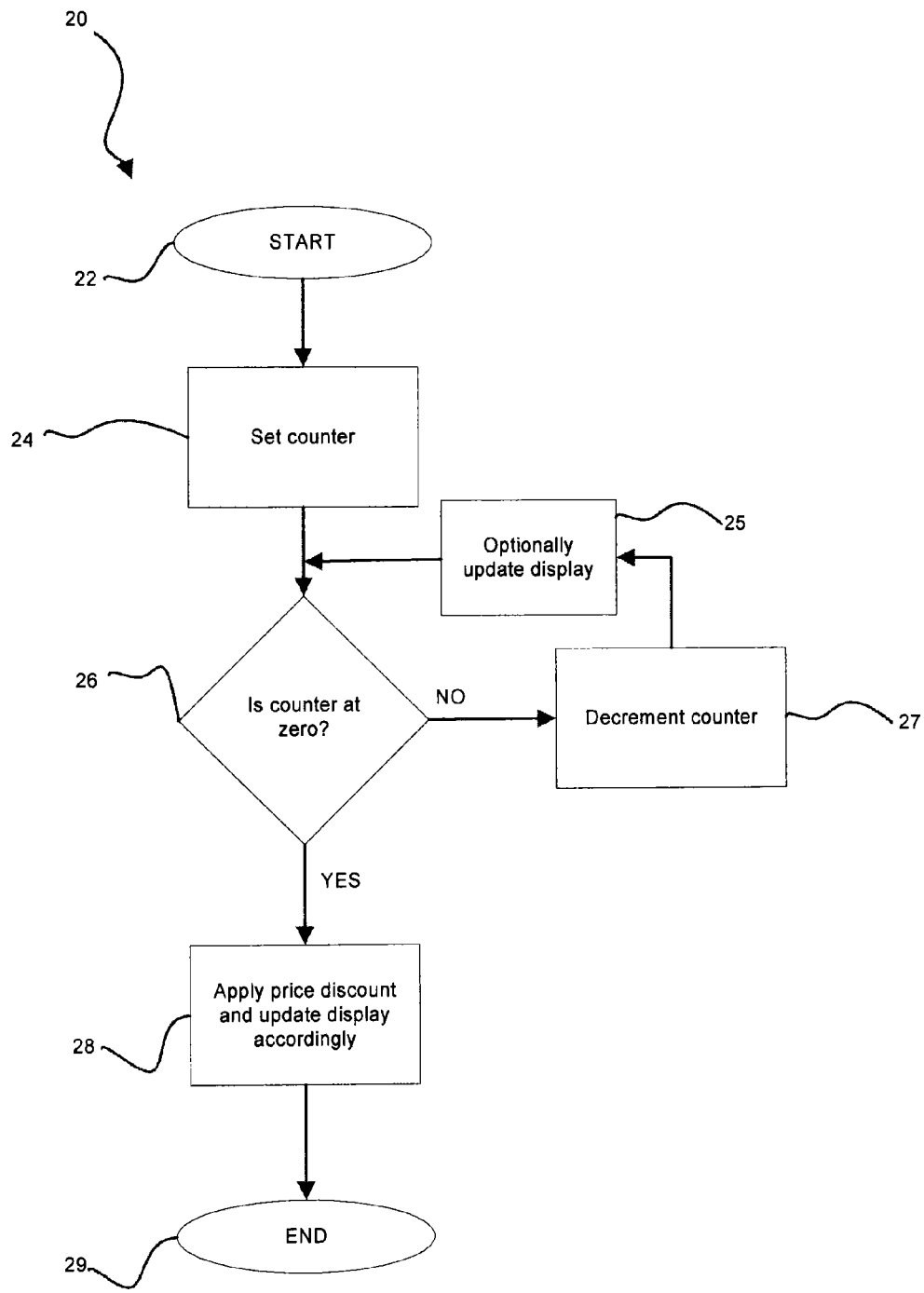
FIG. 2 is a flowchart of one particular implementation of the operation described in FIG. 1, according to one embodiment of the invention.

Referring to FIG. 2, example 20 depicts one particular implementation of the operation described in FIG. 1 by example 10. Starting point 22 illustrates the instant in time when the tag is deployed on a particular retail item. Next, an internal counter is set 24. The operation then proceeds to its recursive state of checking for the counter to reach zero 26 and subsequently decrementing 27 the counter if the counter has not yet reached zero. Recursively decrementing a counter in this way builds in delay within the tag until a desired state (and time in the retail store) has been met. Optionally, as the dynamic tag returns to its recursive state of checking for the counter to reach zero 26, the display can be updated at 25 to reflect the status or timing of when the discount is to be applied, thereby creating a sense of urgency in the customer. Once the counter has reached the zero desired value, as checked by state 26, the discounted price and/or an indication that the discount is now applied is displayed 28. The operation then ends 29. As described above, when the operation ends and/or the display is incrementally updated, the desired price discount or discount status can be either displayed on the tag itself, and can be in the form of a message or code, such as an alphanumeric code, bar code, color code, sound indicator, or any other form of message or code as desired that can be interpreted or applied by the store customer at the time of customer checkout.

Again, referring to FIG. 5A, each counter decrement can correspond with the activation of one increment indicator 104 in series. When the counter reaches zero, and the final increment indicator 104 is activated, indicating that the discount is to be applied. In an alternative embodiment of the invention, referring to FIG. 5B, tag 200 comprises a display 202 having one or more discount amount indicators 204, and an IC within operating a count-down timer (not shown). In the illustrated embodiment each counter decrement can correspond with a different discount amount indicator 204 in series. As the counter is decremented in step 27, the next inactivated discount amount indicator 204 in series is activated, showing an increased discount to be applied. When the counter reaches zero, the final discount amount indicator 204 is activated indicating that the entire desired discount is to be applied to the item at the register. The discount levels can be in increasing or decreasing increments in series as described above, or can be randomly applied, as discussed below.

Figure 3:
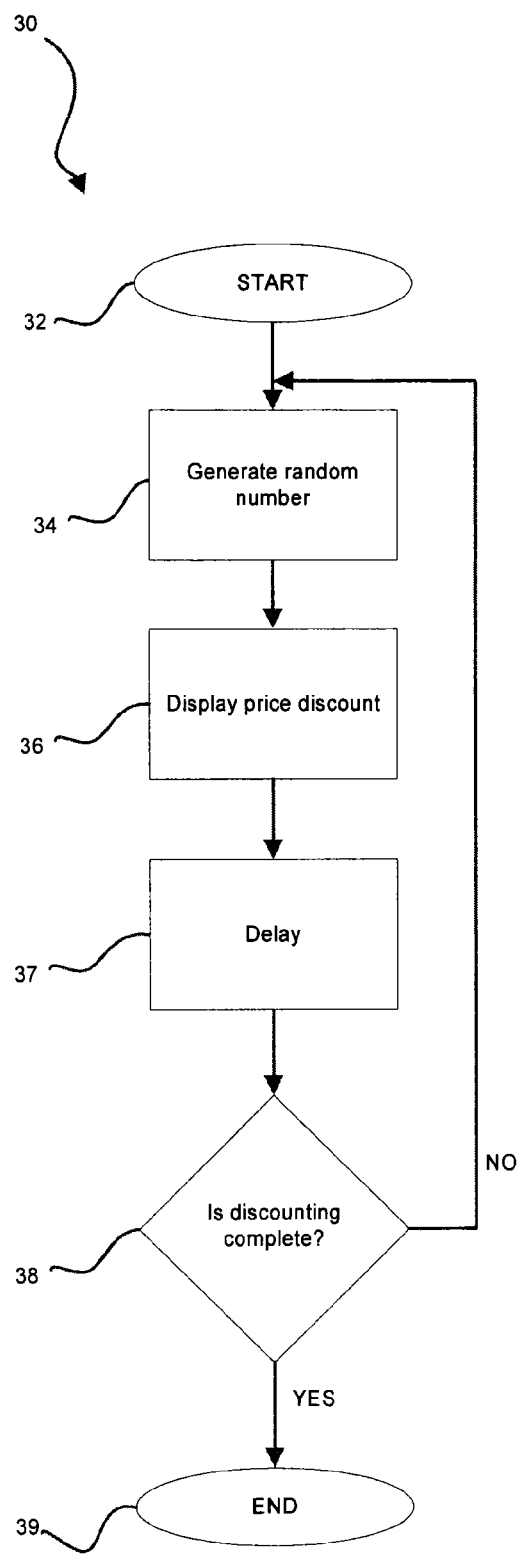
FIG. 3 is a flowchart of the general operation of a self-contained tag utilizing random number generation, according to one embodiment of the invention.

Referring to FIG. 3 and example 30, the dynamic discount price tag of the present invention can also be implemented such that the discounted price and/or the timing of the discount is random. Similar to the previous examples, the operation begins at starting point 32 when the tag is deployed on a particular retail item. The tag then internally generates a random number 34. Generating a random number can be done in any number of ways, including by use of a hash table, the IC's internal clock, by pseudorandom number generator algorithm, or any other method. The random number is correlated to a price discount level selected from a predetermined set of price discount levels, and that discount is displayed 36 on the tag. The discount can be indicated on the tag in the form of a message or code, such as an alphanumeric code, bar code, color code, sound indicator, or any other form of message or code as desired. Because it would be desirable to hold the newly-generated discount constant for some period of time, a delay 37 can be incorporated in the operation. This delay 37 can itself be random.

The operation then proceeds to decision point 38 where the tag decides, based on some factor (a counter, the time, the duration it has been in operation, etc.) whether discounting is complete. If it is, the operation ends at 39. If not, operation restarts at step 34 and steps 34 through 38 are recursively executed until discounting is complete.

Figure 5B:
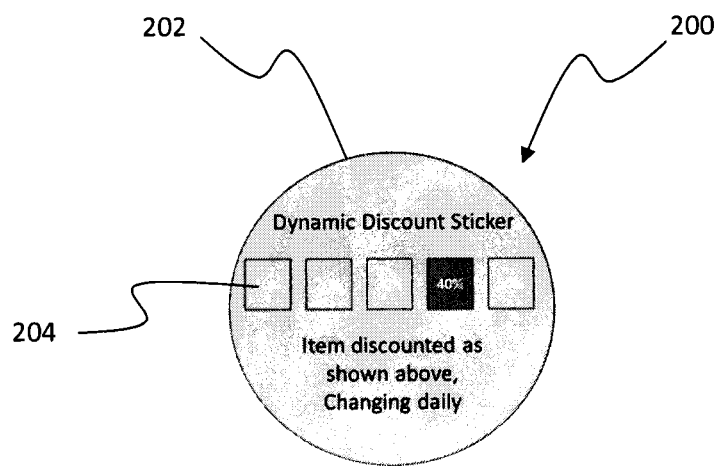

This operation can be used in a tag such as tag 200 illustrated in FIG. 5B, as opposed to incrementally discounting the item in series. In the case of random generation of a discount amount, a number from a predetermined set of numbers corresponds to each indicator 504. When the number is randomly generated, corresponding indicator 504 is activated, indicating a certain predetermined discount to be applied. For example, an item can be randomly discounted at 40% on a first day when a first number corresponding to 40% is randomly generated, and then randomly discounted at 20% the second day when a second number corresponding to 20% is randomly generated.

In an alternative example, the random number generator can be programmed to randomly generate a number from 10-50 corresponding to the discount percentage. For example, on a first day, the random generator can generate 35 such that a 35% discount is applied, while on a second day, the random generator can generate 17 such that a 17% discount is applied.

Figure 4:
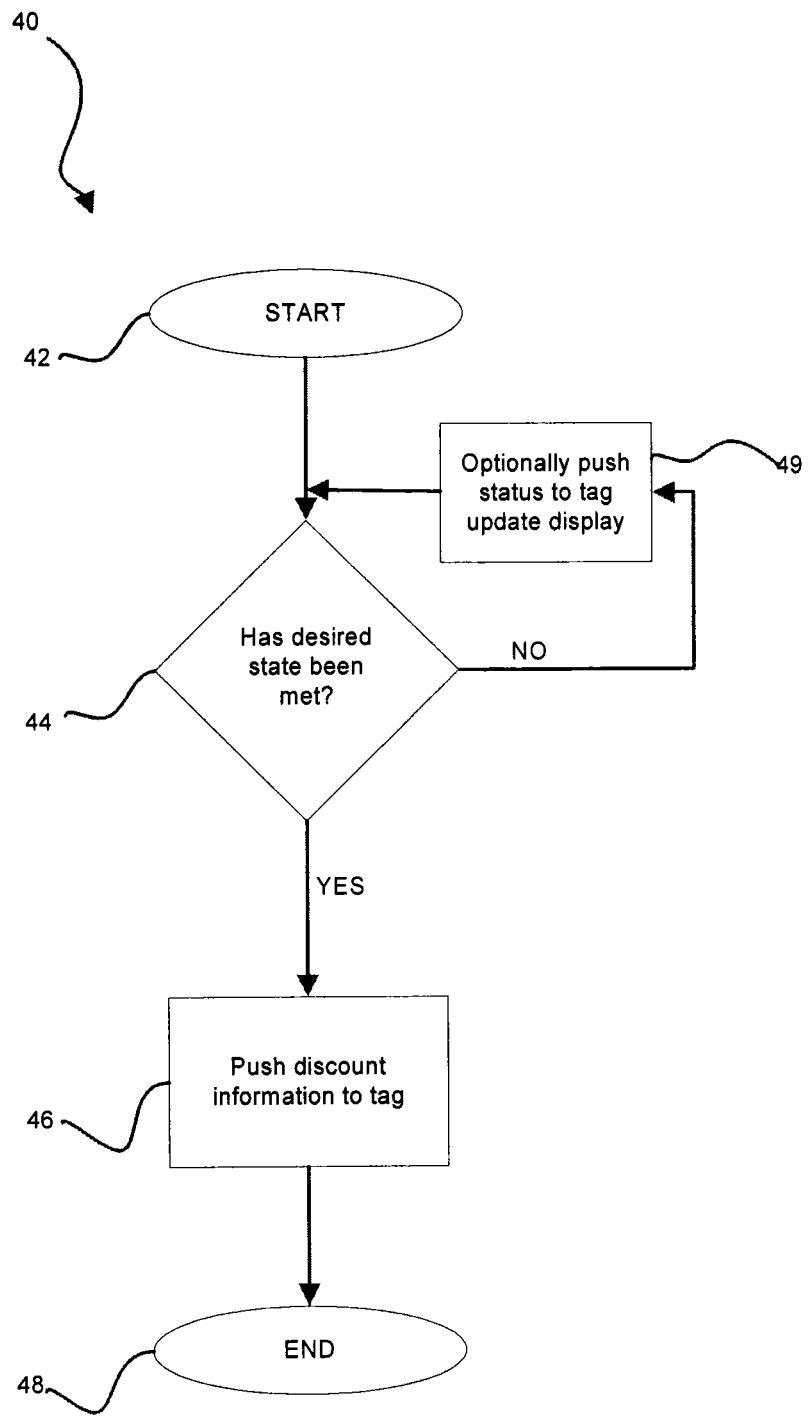
FIG. 4 is a flowchart of the general operation of a tag utilizing a central hub, according to one embodiment of the invention.

In another embodiment, and referring to FIG. 4, a central hub is utilized such that after deployment, the retailer can "push" discount information to individual tags. In example 40, starting point 42 signifies the point at which the tag has been deployed to an individual retail item and the hub has been configured to communicate with the individual tags. As mentioned, this can be done in any number of ways, including by use of a radio or antenna with radio frequency identification (RFID) and accompanying sending device, infrared communication, WiFi communication, hardwired communication, or any other suitable means. The operation proceeds generally by determining at decision point 44, whether a desired state has been met. Decision point 44 can be implemented in any number of ways, like by use of a counter in FIG. 2, by random number generation in FIG. 3, or by any other appropriate means. If the desired state has been met, the calculated discount information is pushed to an individual tag 46 where it is displayed. The operation subsequently ends at 48. However, if desired state 44 has not been met, the recursive loop sends the operation back to checking for the desired state 44, and can optionally push such status to the tag such that the display is updated 49 as described in other examples. When the operation ends, the desired price discount can be either displayed on the tag itself, and can be in the form of a message or code, such as an alphanumeric code, bar code, color code, sound indicator, or any other form of message or code as desired that can be interpreted or applied by the store customer at the time of customer checkout.

Example 40 illustrates an instance of operation by the hub and remote tags. Example 40 can be implemented for every tag deployed. Further, decision point 44 can differ for every implementation such that pricing differs across items of different SKUs and can even differ across individual items of the same SKU, thus creating a "random" effect to the discounts.

The invention may be embodied in other specific forms without departing from the essential attributes thereof; therefore, the illustrated embodiments should be considered in all respects as illustrative and not restrictive.

What is claimed is:

1. A dynamic electronic communication device for generating and displaying or indicating time sensitive information to a viewer, the device comprising components including:
    a display adapted to display the time sensitive information;
    a control means for controlling at least one of generation of the time sensitive information and the display, wherein the control means comprises analog electronics adapted to provide a variable electrical response depending on a status or time;
    a power source adapted to power at least one of the display and the control means; and
    an initialization means for at least one of initializing, resetting, and powering-up the device.

2. The device of claim 1 wherein the device comprises a stand-alone device and can generate and display information without use of communication with an external control means.

3. The device of claim 1, wherein the control means is an integrated circuit (IC) selected from the group including a silicon-based IC, a compound semiconductor-based IC, an organic materials-based IC, a flexible IC, a printed IC, or combinations thereof.

4. The device of claim 1, wherein the display is selected from the group including an electrochromic display, an electrophoretic display, and electrowetting display, a thermochromic display, an LCD, a flexible LCD, an LED based display, an OLED based display, and combinations thereof.

5. The device of claim 1, wherein the power source is selected from the group including a battery, a photovoltaic cell, a capacitor, a fuel cell, an energy harvesting means, and combinations thereof.

6. The device of claim 1, wherein the device further comprises a communication module adapted to at least one of receive and send information to a central hub.

7. The device of claim 6, wherein the communication module comprises a connecting device based on a wireless local area network protocol.

8. The device of claim 7, wherein the connecting device is selected from the group including a BLUETOOTH transceiver, a radio frequency device, a ZIGBEE-based device, an ultra-wideband device, a WiFi device, and combinations thereof.

9. The device of claim 1, wherein the device comprises a thickness of between 20 microns and 3000 microns.

10. The device of claim 9, wherein the device comprises a thickness of between 20 microns and 500 microns.

11. The device of claim 9, wherein the device comprises a thickness of between 50 microns and 150 microns.

12. The device of claim 1, wherein the device is assembled on a flexible substrate selected from the group including plastics, fiberglass, stainless steel metal foil, aluminum foil, paper, woven web, non-woven webs, and combinations thereof.

13. The device of claim 1, wherein the control means includes a counter circuit such that the time sensitive information is displayed on the display when the counter reaches a predetermined state.

14. The device of claim 1, wherein the analog electronics are selected from the group including an electrochemical switch, a chemical switch, and combinations thereof.

15. The device of claim 1, wherein the control means further comprises digital components in combination with the analog electronics.

16. The device of claim 1, wherein the device is fabricated using additive processes selected from the group including printing, coating, spraying, vapor deposition, and combinations thereof using functional materials to create the device.

17. The device of claim 1, wherein at least one component of the device is fabricated using an additive process on a flexible substrate, and at least another component of the device is secured to the flexible substrate using a non-additive process.

18. A dynamic electronic communication device for generating and displaying or indicating time sensitive information to a viewer, the device comprising components including:
    a display adapted to display the time sensitive information;
    a control means for controlling at least one of generation of the time sensitive information and the display, wherein the control means comprises a combination of digital and analog components;
    a power source adapted to power at least one of the display and the control means; and an initialization means for at least one of initializing, resetting, and powering-up the device.

19. The device of claim 18, wherein at least some of the combination of digital and analog components comprise electronics adapted to provide a variable electrical response depending on a status or time.

20. A dynamic electronic communication device for generating and displaying or indicating time sensitive information to a viewer, the device comprising components including:
- a display adapted to display the time sensitive information;
- a control means for controlling at least one of generation of the time sensitive information and the display;
- a power source adapted to power at least one of the display and the control means; and
- an initialization means for at least one of initializing, resetting, and powering-up the device,
- wherein the device is fabricated using additive processes selected from the group including printing, coating, spraying, vapor deposition, and combinations thereof using functional materials to create the device.

21. A dynamic electronic communication device for generating and displaying or indicating time sensitive information to a viewer, the device comprising components including:
- a display adapted to display the time sensitive information;
- a control means for controlling at least one of generation of the time sensitive information and the display;
- a power source adapted to power at least one of the display and the control means; and
- an initialization means for at least one of initializing, resetting, and powering-up the device,
- wherein at least one component of the device is fabricated using an additive process on a flexible substrate, and at least another component of the device is secured to the flexible substrate using a non-additive process.

* * * * *